US008817718B2

(12) United States Patent
Pajukoski et al.

(10) Patent No.: US 8,817,718 B2
(45) Date of Patent: Aug. 26, 2014

(54) RANDOMIZATION OF BLOCK SPREAD SIGNALS (75) Inventors: Kari P. Pajukoski, Oulu (FI); Kari J. Hooli, Oulu (FI); Esa T. Tiirola, Kempele (FI)

(73) Assignee: Nokia Siemens Networks Oy, Espoo (FI)

( * ) Notice: Subject to any disclaimer, the term of this patent is extended or adjusted under 35 U.S.C. 154(b) by 178 days.

(21) Appl. No.: 13/209,685

(22) Filed: Aug. 15, 2011

(65) Prior Publication Data

US 2012/0039281 A1 Feb. 16, 2012

Related U.S. Application Data (60) Provisional application No. 61/373,976, filed on Aug. 16, 2010.

(51) Int. Cl.
*H04W 4/00* (2009.01)
*H04J 11/00* (2006.01)
*H04L 27/26* (2006.01)
*H04J 13/00* (2011.01)

(52) U.S. Cl.
CPC .......... *H04J 11/003* (2013.01); *H04J 13/0074* (2013.01); *H04J 13/004* (2013.01); *H04L 27/2636* (2013.01)
USPC .......................................... 370/329; 375/140

(58) Field of Classification Search
CPC ..................... H04W 72/0466; H04L 27/26
USPC ................... 370/208, 335, 342, 320
See application file for complete search history.

(56) References Cited

U.S. PATENT DOCUMENTS

| 2008/0101306 | A1* | 5/2008 | Bertrand et al. | 370/336 |
| 2008/0212464 | A1* | 9/2008 | Kim et al. | 370/210 |
| 2008/0298433 | A1* | 12/2008 | Tiirola et al. | 375/132 |
| 2009/0046691 | A1* | 2/2009 | Karjalainen et al. | 370/342 |
| 2010/0254434 | A1* | 10/2010 | Iwai et al. | 375/141 |
| 2010/0296452 | A1* | 11/2010 | Futagi et al. | 370/328 |
| 2011/0188447 | A1* | 8/2011 | Wang et al. | 370/328 |
| 2011/0286543 | A1* | 11/2011 | Nakao et al. | 375/295 |

OTHER PUBLICATIONS

3GPP TSG RAN WG1 Meeting #61 bis, Dresden, Germany, (Jun. 28-Jul. 2, 2010), R1-103506, Ericsson,"PUCCH Design for CA", (5 pages).
3GPP TS 36.300 V8.6.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", Sep. 2008, 137 pages.
3GPP TSG RAN WG1 #46bis, R1-062841, "Multiplexing of L1/L2 Control Signalling when UE has no data to transmit", Seoul, Korea, Oct. 9-13, 2006, 7 pages.

(Continued)

*Primary Examiner* — Chi Pham
*Assistant Examiner* — Fahmida Chowdhury
(74) *Attorney, Agent, or Firm* — Harrington & Smith (57) ABSTRACT A user equipment locally stores a shift pattern that is specific to a cell to which the user equipment is currently attached, and processes a group of modulation symbols or bits for uplink transmission by a) cyclically shifting the modulation symbols or bits within the group according to the stored cell-specific shift pattern, and b) applying a spreading code to the group of symbols or bits. Different embodiments include spatial shifting and frequency bin shifting.

20 Claims, 6 Drawing Sheets (56) References Cited

OTHER PUBLICATIONS

3GPP TSG RAN WG1 Meeting #56bis, R1-091353, "On CSI feedback signalling in LTE-Advanced uplink", Seoul, Korea, Mar. 23-27, 2009, 4 pages.

3GPP TSG RAN WG1 Meeting #51, R1-074812, "On PUCCH Structure for CQI Report", Jeju, Korea, Nov. 5-9, 2007, 7 pages.

3GPP TSG-RAN WG1 #60, R1-100909, "A/N transmission in the uplink for carrier aggregation", San Francisco, USA, Feb. 22-26, 2010, 4 pages.

3GPP TSG-RAN WG1 #60bis, R1-101730, "PUCCH design for carrier aggregation", Beijing, China, Apr. 12-16, 2010, 4 pages.

3GPP TSG-RAN WG1 #62bis, R1-10xxxx, "Draft Report of 3GPP TSG RAN WG1 #61bis v.0.1.0", Madrid, Spain, Aug. 23-27, 2010, 92 pages.

R1-101731; Ericsson, ST-Ericsson; "Evaluation of Pucch Proposals for Carrier Aggregation"; 3GPP TSG-RAN WG1 #60bis; Beijing, China, Apr. 12th—16th, 2010.

R1-102716; LG Electronics; "Performance Comparisons of CA PUCCH Formats"; 3GPP TSG RAN WG1 #61; Montreal, Canada, May 10-14, 2010.

R1-073619; Panasonic; "Cell Specific Cyclic Shift Hopping v.s. UE specific Cyclic Shift Hopping for Uplink ACK/NACK Signals"; 3GPP TSG RAN WG1 Meeting #50; Athens, Greece, Aug. 20-24, 2007.

R1-102453; Gatt; "UL ACK/NACK transmission methods for LTE-A"; 3GPP TSG RAN WG1 Meeting #60bis; Beijing, China, Apr. 12th—16th, 2010.

R1-104429; Nokia Siemens Networks, Nokia; "Details for Block Spread DFT-S-OFDMA"; 3GPP TSG RAN WG1 Meeting #62; Madrid, Spain, Aug. 23rd—27th, 2010.

\* cited by examiner

RANDOMIZATION OF BLOCK SPREAD SIGNALS

CROSS-REFERENCE TO RELATED APPLICATIONS

This patent application claims priority under 35 U.S.C. §119(e) from Provisional Patent Application No. 61/373,976 filed Aug. 16, 2010, the disclosure of which is incorporated by reference herein in its entirety.

TECHNICAL FIELD

The exemplary and non-limiting embodiments of this invention relate generally to wireless communication systems, methods, devices and computer programs and, more specifically, relate to mitigating co-channel interference between transmissions from adjacent cells of a wireless communication system,

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
3GPP third generation partnership project
ACK acknowledge
CDM code division multiplexing
DL downlink (eNB towards UE)
DRX discontinuous transmission
eNB EUTRAN Node B (evolved Node B)
EUTRAN evolved UTRAN (LTE)
FFT fast Fourier transform
DFT discrete Fourier Transformation
DFT-S OFDMA DFT spread OFDMA
HARQ hybrid automatic repeat request
IFFT inverse fast Fourier transformation
LTE long term evolution
MAC medium access control
MM/MME mobility management/mobility management entity
NACK not acknowledge/negative acknowledge
Node B base station
OFDMA orthogonal frequency division multiple access
PDCCH physical downlink control channel
PUCCH physical uplink control channel
RF radio frequency
RS reference symbol
SC-FDMA single carrier, frequency division multiple access
SF spreading factor
UE user equipment
UL uplink (UE towards eNB)
UTRAN universal terrestrial radio access network In the communication system known as evolved UTRAN (EUTRAN, also referred to as LTE, E-UTRA or 3.9G), the downlink access technique is OFDMA, and the uplink access technique is SC-FDMA in completed LTE Release 8. A further release of 3GPP LTE, referred to herein as LTE-Advanced (LTE-A) is directed toward extending and optimizing the 3GPP LTE Release 8 radio access technologies to provide higher data rates at low cost. LTE-A is expected to be incorporated into LTE Release 10 which is currently under development, and will continue the Release 8 access techniques noted above.

Figure 1:
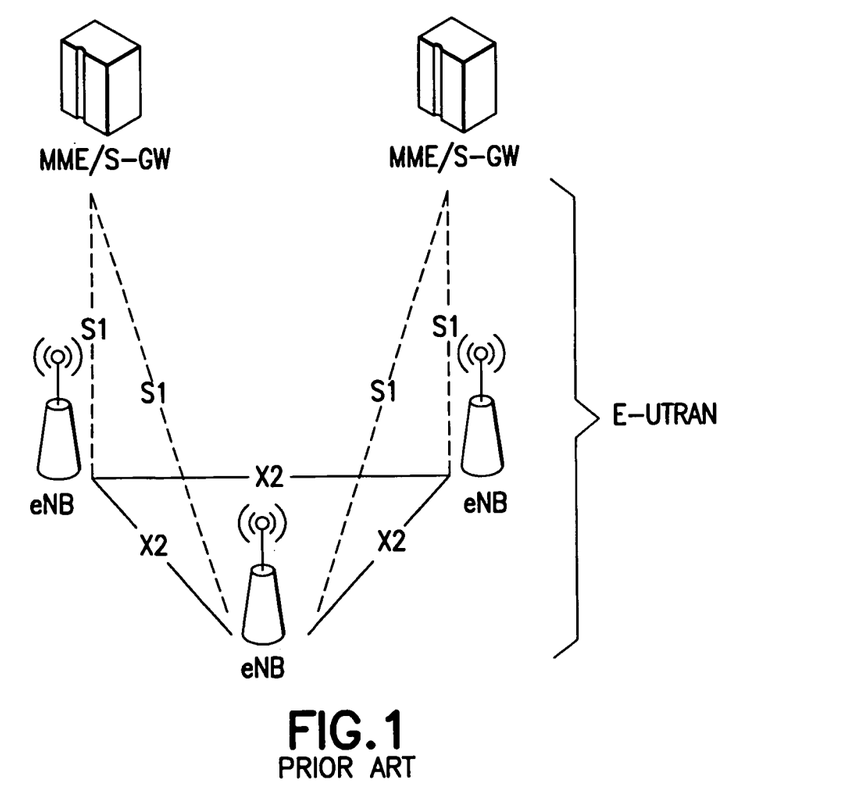
FIG. 1 reproduces FIG. 4 of 3GPP TS 36.300, and shows the overall architecture of the E-UTRAN system.

FIG. 1 reproduces FIG. 4.1 of 3GPP TS 36.300, V8.6.0 (2008-09), and shows the overall architecture of the E-UTRAN system. The EUTRAN system includes eNBs, providing the EUTRA user plane and control plane protocol terminations towards the UE. The eNBs are interconnected with each other by means of an X2 interface. The eNBs are also connected by means of an S1 interface to a Mobility Management Entity (MME) and to a Serving Gateway (S-GW). The S1 interface supports a many to many relationship between MMEs/S-GWs and eNBs.

It has been agreed in LTE-A during RAN1 #61 bis that block spread DFT-S-OFDMA is used as a signaling scheme for HARQ-ACK/NACK on the PUCCH for Release 10 UEs that support more than 4 downlink ACK/NACK bits with carrier aggregation. See for example documents R1-062841 entitled *Multiplexing of L1/L2 Control Signalling when UE has no data to transmit* (by Nokia); R1-091353 entitled *On CSI feedback signalling in LTE-Advanced uplink* (by Nokia Siemens Networks and Nokia); and R1-074812 entitled *On PUCCH Structure for CQI Report* (by NTT DoCoMo, Nokia Siemens Networks, Nokia, Mitsubishi Electric, and Toshiba Corporation). In general the goal of randomization is to limit interfering block spread DFT-signal(s) that originate from adjacent cells such as the two adjacent eNBs shown at FIG. 1.

Figure 2:
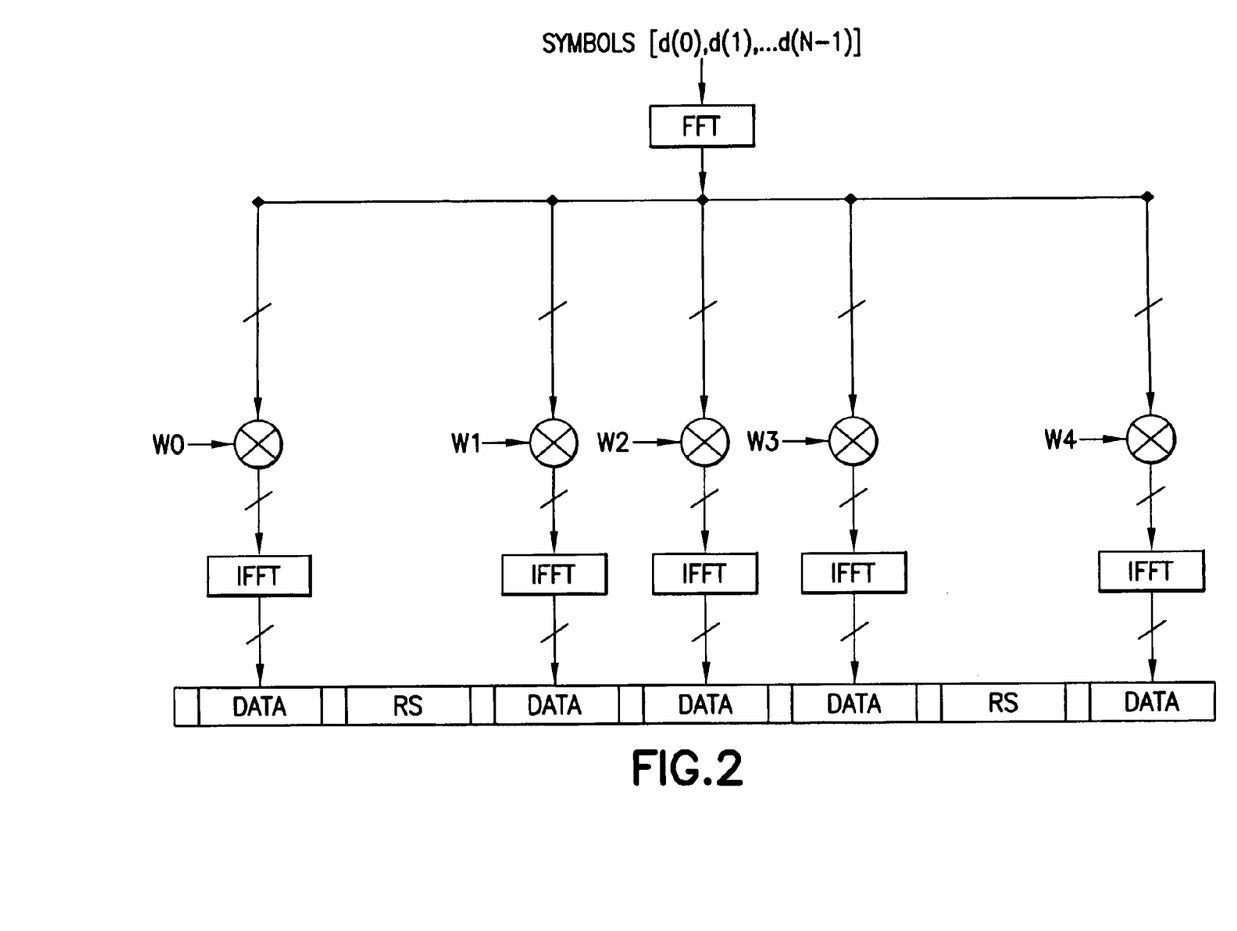
FIG. 2 is a block level diagram of circuitry for block-spreading DFT-S-OFDM with a spreading factor of five.

FIG. 2 illustrates a block level description of block-spread DFT-S-OFDM with SF=5. Data signals from different UEs within a single cell are separated by different block level spreading codes, represented as w. At FIG. 2, a FFT is performed on modulation symbols [d(0), d(1), . . . d(N)] which are then multiplied by the SF=5 elements w0, w1, . . . w4 of one particular UE's spreading code w, parallel IFFTs are done on those five results and the time domain OFDMA symbol is inserted into a transmission frame with reference symbols RSs which the UE sends on the UL.

One challenge in LTE-A at least is that there are not enough block spreading codes available to provide sufficient randomization in the block code domain between cells. But randomization is important for CDM-based schemes such as DFT-S-OFDMA in order to attenuate co-channel interference between the UEs using the same block spreading code. Otherwise transmissions from one UE operating for example at an edge of a first cell might regularly interfere with transmissions from another UE operating in an adjacent cell and using the same block spreading code.

One possible solution is to scramble the encoded bits with DFT-S-OFDMA symbol specific and cell specific scrambling sequences. This is detailed at documents R1-100909 entitled *A/N transmission in the uplink for carrier aggregation*; and R1-101730 entitled *PUCCH design for carrier aggregation*, both of which are by Ericsson and ST-Ericsson. But the scrambling sequences need to be DTF-S-OFDMA symbol specific, i.e., vary between DFT-S-OFDM symbols because the same data symbols [d(0), . . . d(N−1)] remain unchanged between the DFT-S-OFDM symbols. It is advantageous to scramble in the time domain (before the FFT or after the IFFT) as shown at FIG. 1 of document R1-101730 to avoid increasing the peak-to-average power ratio (PAR or PAPR). But scrambling before the FFT processing means that instead of one FFT block as in FIG. 2 there would be the added complexity of a separate FFT block immediately upstream of each IFFT block as is shown in FIG. 1 of document R1-101730.

Exemplary embodiments of this invention mitigate co-channel interference by randomizing block-spread transmissions from UEs in adjacent cells without adding the complexity as is noted above, even if there are not enough different block spreading codes to do so directly by assigning a spreading code that is unique to all UEs across all adjacent cells.

SUMMARY

In an exemplary aspect of the invention there is a method, comprising processing a group of modulation symbols for uplink transmission comprising cyclically shifting the modulation symbols within the group according to a cell-specific shift pattern, and applying a spreading code to the group of symbols.

In an exemplary aspect of the invention there is an apparatus, comprising at least one processor; and at least one memory including computer program code, where the at least one memory and the computer program code are configured, with the at least one processor, to cause the apparatus to at least process a group of modulation symbols for uplink transmission comprising cyclically shifting the modulation symbols within the group according to a cell-specific shift pattern, and applying a spreading code to the group of symbols.

In another exemplary aspect of the invention there is an apparatus comprising: means for processing a group of modulation symbols for uplink transmission comprising means for cyclically shifting the modulation symbols within the group according to a cell-specific shift pattern, and means for applying a spreading code to the group of symbols.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

In an exemplary embodiment of the invention the UE determines a shift pattern that is specific to a cell to which the UE is currently attached. The UE may learn the shift pattern from transmissions from the eNB (system information for example) or knowledge of the shift pattern may be from using a cell index or system frame number or system slot number as an input to a formula pre-stored in the UE's memory (such as where a governing wireless specification sets the formula which all UEs and eNBs follow). Consider that when the UE then has uplink information to send it is in the form of a group of symbols or bits. The information may exist in the symbol or bit grouping at baseband, at an intermediate frequency, or at radio frequency depending on specific implementations. By example the group of symbols or bits are ACK, NACK and/or DTX bits which the UE intends to signal on a PUCCH in response to the eNB's transmitted PDCCH (or more generally a downlink scheduling allocation). The UE processes this single group of symbols or bits for uplink transmission in two respects. The UE cyclically shifts the symbols or bits within the group according to the stored cell-specific shift pattern. And the UE applies to the group of symbols or bits the spreading code that is assigned to it in the cell. For LTE-A this is a UE-specific spreading code that is unique per cell but not necessarily unique when considering UEs in adjacent cells.

In this manner the ACK/NACK/DRX data symbols within a DFT-S-OFDMA symbol are shifted cyclically according to a pre-determined and pseudo-random shifting pattern that is specific for a cell. While the below detailed description is in the context of LTE-A and DFT-S-OFDMA signaling on the UL, the broader teachings herein for randomizing transmissions to avoid or mitigate co-channel interference are not limited to OFDMA symbols, nor to LTE-A/Release 10, nor to only control signaling.

Exemplary embodiments of the invention also realize DFT-S-OFDMA symbol randomization without introducing additional DFT operations, which is seen to be the case for prior art documents R1-101730 and R1-100909 noted in the background section above.

The exemplary randomization schemes presented herein can in some embodiments be applied on top of variable block spreading codes. Alternatively, in other embodiments the same block spreading code may be used in all cells and the UE transmissions may still be randomized according to these teachings.

Figure 3:
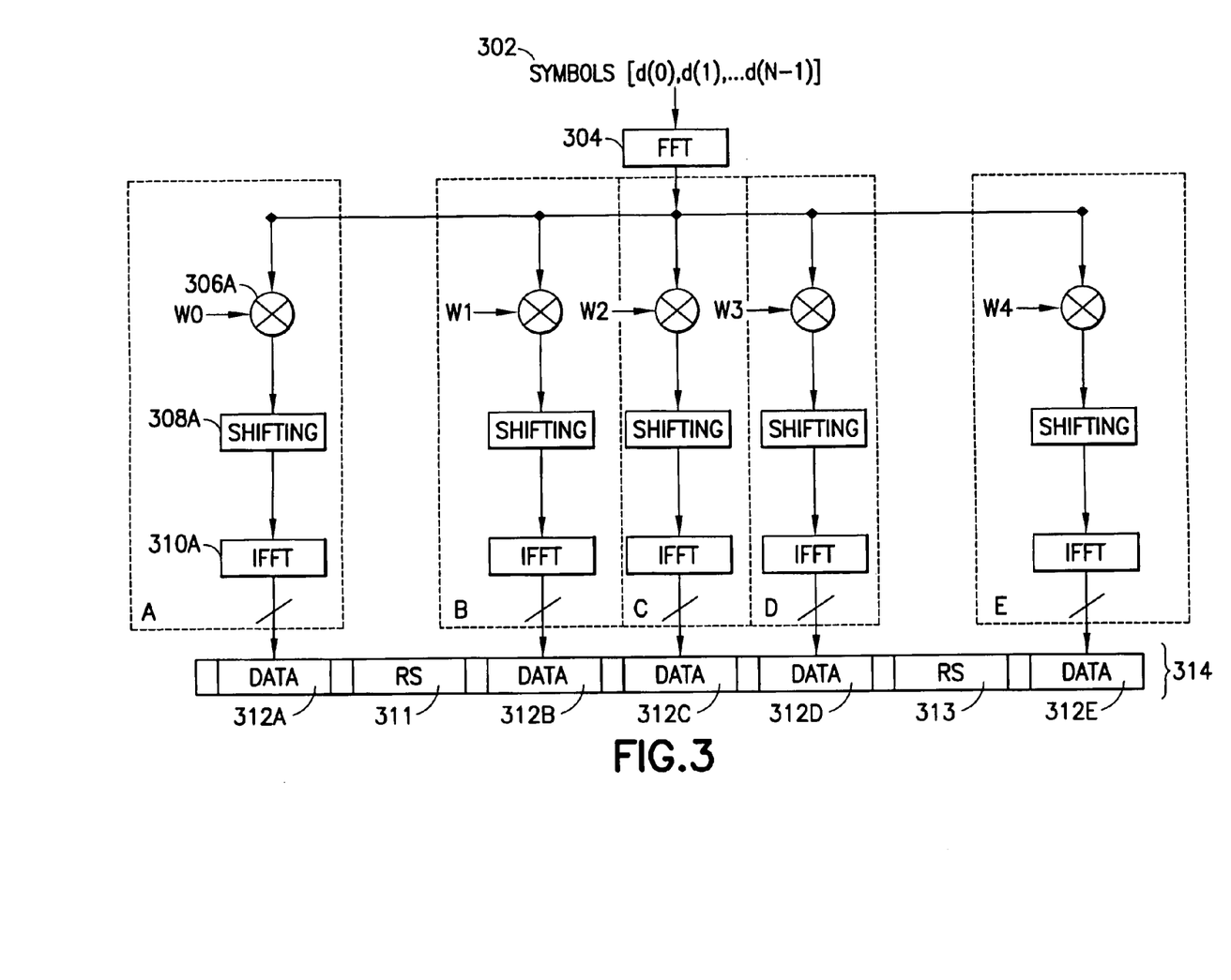
FIG. 3 is a block level diagram of circuitry for block-spreading DFT-S-OFDM with a spreading factor of five according to an exemplary embodiment of the invention which cyclically shifts in time.

FIG. 3 is a block level diagram of functional blocks within a UE for block-spreading DFT-S-OFDM. Like FIG. 2 SF=5, and FIG. 3 illustrates a particular embodiment of the invention in which the cyclic shifts are in time. Currently, LTE-A uses N=12 modulation symbols per OFDMA symbol in a PUCCH, but for simplicity let us assume for FIG. 3 that N=6 and so there are six modulation symbols 302 represented as [d0,d1,d2,d3,d4,d5] carrying information the UE wishes to signal on the UL. By example each of these six is selected from the set ACK, NACK and DTX and they are sent on a PUCCH in reply to a PDCCH. These un-shifted N=6 modulation symbols are Fourier transformed at block 304, which may be a fast Fourier transform FFT or a DFT.

FIG. 3 further exhibits five parallel processing pathways represented as A through E and offset by dashed boxes. Each processing pathway will result in one OFDMA symbol in the PUCCH 314 and operates similarly so only one pathway A will be detailed. In the embodiment of FIG. 3 each processing pathway A through E first multiplies the frequency-domain group of modulation symbols [d0,d1,d2,d3,d4,d5] by a unique one of the SF=5 elements [w0, w1, w2, w3, w4] of the UE's spreading code w as illustrated. Pathway A uses a multiplier 306A to multiply the frequency domain group of modulation symbols [d0,d1,d2,d3,d4,d5] by spreading element w0, and so the output of the multiplier is [w0d0, w0d1, w0d2, w0d3, w0d4, w0d5]. It is this output on which the cyclic shifting is done at shifter 308A.

Term the shift pattern for this cell as s0, and assume for the FIG. 3 example that for N=6 modulation symbols s0 gives the following shifting pattern:

s0 shift 1: [d1,d2,d3,d4,d5,d0]
s0 shift 2: [d2,d3,d4,d5,d0,d1]
s0 shift 3: [d3,d4,d5,d0,d1,d2]
s0 shift 4: [d4,d5,d0,d1,d2,d3]
s0 shift 5: [d5,d0,d1,d2,d3,d4]
s0 shift 6: [d0,d1,d2,d3,d4,d5]

While the 'shift 6' group of symbols above is not shifted as compared to the group 302 input to the FFT block 304, it is nonetheless a shift as compared to the 'shift 5' series preceding it in the above sequence of shifted symbols. Note that in this example the symbols are shifted relative to one another. This is a shifting in time; the sequence of the symbols is changed. The cell-specific shift pattern yields at least the N=6 total shifts shown by example above since there are N modulation symbols being shifted. But since at FIG. 3 the shifting of those N modulation symbols occurs in the frequency domain (logically this is a shifting in time but mathematically it may be considered a shifting in phase), it is possible for certain exemplary embodiments that the total number of unique shifts in the overall pattern is greater than the number N of modulation symbols being shifted.

Term the above cell-specific shifts as s0, and assume for this example that the respective first five of the above six shifts are imposed by the respective shifting blocks at the respective five processing pathways A through E of FIG. 3. The shifting block 308A which lies along pathway A in FIG. 3 applies 'shift 1' and its input and output are as follows:
  Input to shifting block 308A: [w0d0, w0d1, w0d2, w0d3, w0d4, w0d5];
  Output of shifting block 308A: [w0d1, w0d2, w0d3, w0d4, w0d5, w0d0].

The shifting block which lies along pathway B in FIG. 3 applies 'shift 2' and its input and output are the following frequency-domain groupings of modulation symbols:
  Input to shifting block on path B: [w1d0, w1d1, w1d2, w1d3, w1d4, w1d5];
  Output of shifting block on path B: [w1d2, w1d3, w1d4, w1d5, w1d0, w1d1].

Similar applies for the other processing pathways for the other respective shifts. An IFFT is performed on the output of the shifter block (other interim processing may take place in certain implementations), shown by IFFT block 310A on processing pathway A. Eventually, from pathway A is generated an DFT-S-OFDMA symbol 312A. Similar such DFT-S-OFDMA symbols 312B, 312C, 312D, 312E are generated from the other respective processing lines. RSs 311, 313 are interspersed among the DFT-S-OFDMA symbols according to a pre-determined pattern to form the whole timeslot of PUCCH 314.

Now consider FIG. 3 from the perspective of a UE operating simultaneously in an adjacent cell which happens to be assigned the exact same spreading code w=[w0, w1, w2, w3, w4] as is the UE described above for FIG. 3. Assume further that both UEs are sending all-ACKs on their respective PUCCHs at the same time, so the originating group of symbols 302 is also identical. The shifting pattern s0 used in the example of FIG. 3 is cell-specific, and so the adjacent cell will have its own cell-specific shifting pattern s1 that is not identical to s0.

By example, assume that the shifting pattern s1 for this adjacent cell gives the following shifting pattern:
  s1 shift 1: [d2,d3,d4,d5,d0,d1]
  s1 shift 2: [d3,d4,d5,d0,d1,d2]
  s1 shift 3: [d4,d5,d0,d1,d2,d3]
  s1 shift 4: [d5,d0,d1,d2,d3,d4]
  s1 shift 5: [d0,d1,d2,d3,d4,d5]
  s1 shift 6: [d2,d2,d3,d4,d5,d0]

As with the first cell operating with s0, UEs attached to this adjacent cell will use only the first five of these s1 shifts. Assuming both UEs in the different cells transmit their PUCCHs at exactly the same time and the underlying data and spreading codes are identical as assumed above, the OFDMA symbol transmitted by the UE in the adjacent cell which corresponds in time to the OFDMA symbol 312A shown at FIG. 3 will then be [w0d2, w0d3, w0d4, w0d5, w0d0, w0d1], which differs from that detailed above as being output from the shifting block 308A of the first UE.

In this manner, a level of randomization is imposed on transmissions by UEs operating in different cells so as to mitigate co-channel interference among UEs which might be assigned the same spreading code. For this reason these teachings operate to mitigate co-channel interference also when the spreading codes are not UE-specific per cell.

Even if the PUCCH transmission timing were such that identically shifted DFT-S-OFDMA symbols from UEs in different cells interfere with each other, the interference would be limited to only one DFT-S-OFDMA symbol because the randomization disrupts patterns from repeating across different cells.

With the scrambling described by documents R1-101730 and R1-100909 noted in the background section above, if there are same data symbols originating from UEs in different cells, they would interfere with each other in every DFT-S-OFDMA symbol, but interference is randomized by varying phase. To the contrary, the above exemplary embodiment of this invention shifts data symbols cyclically from one DFT-S-OFDMA symbol to another according to a cell specific pseudo-random shifting pattern. Therefore, it is different data symbols that originate from different cells which might possibly interfere with each other in consecutive DFT-S-OFDMA symbols, which provides inter-cell interference randomization to disrupt any same patterns repeating across adjacent cells and avoid interference among multiple/consecutive OFDMA symbols.

Note that in FIG. 3 the shifter blocks can alternatively be disposed upstream of the multiplier blocks so that the cyclic shift is imposed prior to multiplying the relevant element of the spreading code w. Re-tracing the above example for FIG. 3 will show an identical result for input to the IFFT blocks will be obtained. Similar holds true if the cyclic shifts were to be imposed prior to the FFT block 304 of FIG. 3 (though FFT processing per pathway A through E may be preferable in that case so as to form the transmission frame without delay from serial processing the multiple shifts through one FFT block).

The above FIG. 3 example is logically a time shift of the modulation symbols 302, despite the fact this time shift was done in the frequency domain between the FFT 304 and the IFFT 310A. A similar randomization may be obtained by cyclically shifting the symbols/bits of the group 302 in their frequency response. In short, rather than spatially re-ordering the sequence of the symbols/bits 302 themselves, the symbols/bits are placed into frequency bins and the order of the frequency bins into which the symbols/bits are placed is cyclically varied according to a cell-specific shifting pattern. So for example, if one considers the frequency bins f0, f1, f2, f3, f4 to be in sequential frequency order, an exemplary cell specific shifting pattern fs2 might be represented as:
  fs2 shift 1: [f1,f2,f3,f4,f0]
  fs2 shift 2: [f2,f3,f4,f0,f1]
  fs2 shift 3: [f3,f4,f0,f1,f2]
  fs2 shift 4: [f4,f0,f1,f2,f3]
  fs2 shift 5: [f0,f1,f2,f3,f4]

Figure 4:
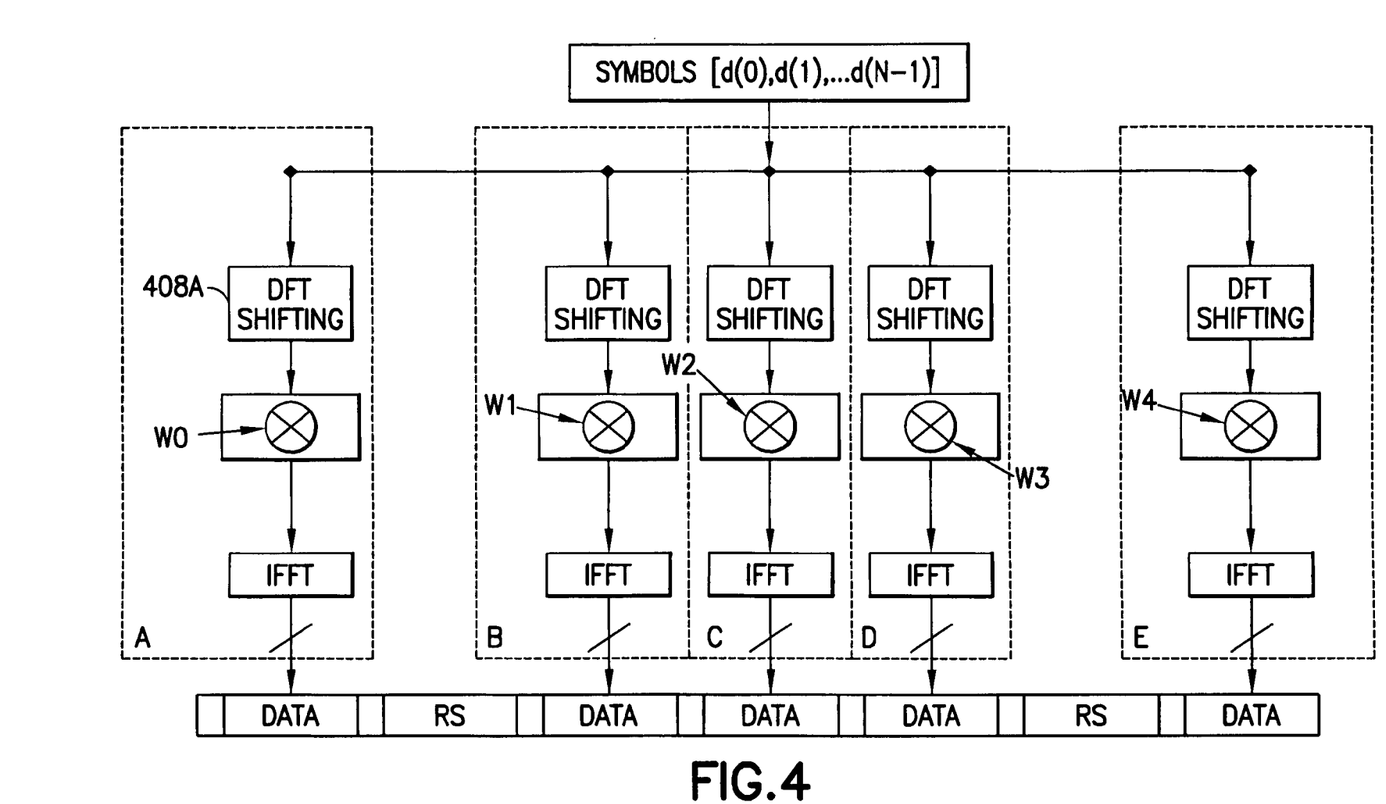
FIG. 4 is a block level diagram of circuitry for block-spreading DFT-S-OFDM with a spreading factor of five according to an exemplary embodiment of the invention which cyclically shifts in frequency response.

The sequence of symbols/bits 302 placed into the frequency bins would not need to be changed as in FIG. 3 since the randomization is imposed by cyclically shifting the frequencies to which the symbols/bits are processed by the DFT block. FIG. 4 gives an exemplary embodiment of a functional arrangement for cyclically shifting the frequency response of data symbols. FIG. 4 is identical to FIG. 3 except there is a separate DFT processing block on each processing pathway A through E and each different one of them imposes a different cyclic shift of the frequency bins. By example the DFT shifting block 408A along pathway A imposes the 'fs2 shift 1' given above by example, and the other processing pathways B through E impose the respective other fs2 shifts given above.

In this cyclic frequency shifting case, the inter-cell interference randomization is realized in that different frequency bins of data symbols interfere with each other in consecutive DFT-S-OFDMA symbols.

In either spatial shifting or frequency bin shifting embodiments, the number of DFT-S-OFDMA symbol specific shifting value varies according to the number of N of modulation symbols per DFT-S-OFDMA symbol, for example [0, 1, . . . , 11] in the case of N=12 modulation symbols. In either time or frequency bin shifting embodiments, the cyclic shift pattern may be a pseudorandom sequence based on the cell index and system frame or slot number.

In one embodiment, the block spreading codes used between pre-defined cells is coordinated instead of randomized. Adjacent eNBs may coordinate their use of UE-specific block spreading codes in a pre-determined manner, so for example a first eNB may refrain from using a certain spreading code or other orthogonal resource space which the adjacent second eNB uses that same resource space most frequently. In this manner there is coordination among eNBs within certain groups of resources but no coordination between different groups. Coordination helps mitigate interference within a coordinated group, while randomization is the vehicle to mitigate interference between different groups. In some embodiments the coordinated usage of block spreading codes can be realized in such a way that the same shifting sequence (and the same block spreading code) is configured for those cells under coordinated usage.

In one specific embodiment there is defined a separate cell- and symbol—specific shifting sequence for block-spread DFT-S-OFDMA purposes. In another specific embodiment the LTE Release 8/Release 9 cyclic shift hopping pattern defined for PUCCH is applied as the shifting pattern for modulation symbols of block spread DFT-S-OFDMA symbols. Note in this regard that the RSs 311, 313 shown at FIG. 3 can follow cyclic shift hopping detailed for LTE Release 8/Release 9 in both spatial shifting and frequency bin shifting approaches.

One technical effect of the above detailed exemplary embodiments is that the randomization is simple to implement from both the UE and the eNB perspective so large changes to existing infrastructure will not be necessary. Furthermore, these teachings can maximally reuse the now-existing building blocks for the PUCCH signaling, meaning standardization will also be straightforward. And of course another technical effect is the sufficient randomization for block spread DFT-S-OFDMA which embodiments of these teachings provide.

Figure 5:
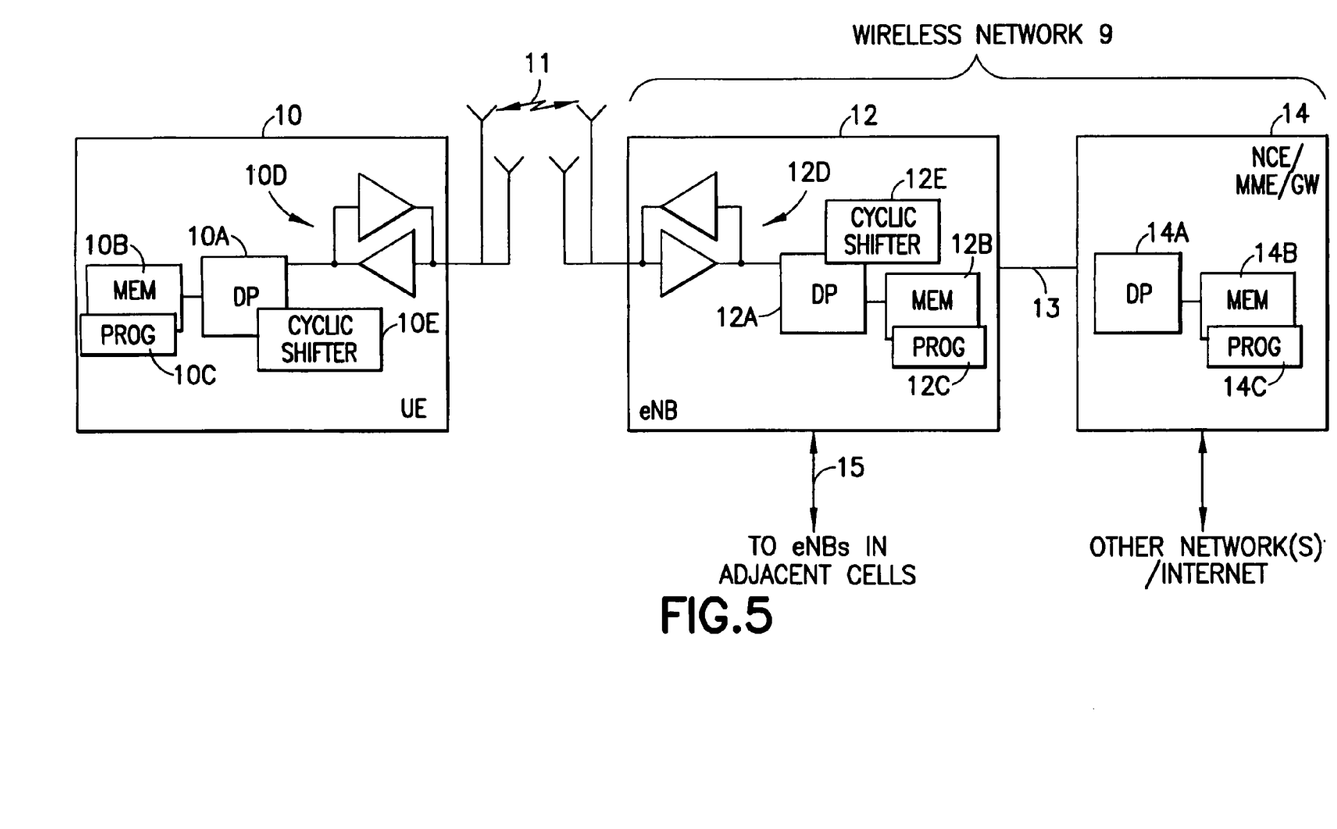
FIG. 5 shows a simplified block diagram of various electronic devices that are suitable for use in practicing the exemplary embodiments of this invention.

Reference is now made to FIG. 5 for illustrating a simplified block diagram of various electronic devices and apparatus that are suitable for use in practicing the exemplary embodiments of this invention. In FIG. 5 a wireless network 9 is adapted for communication over a wireless link 11 with an apparatus, such as a mobile communication device which may be referred to as a UE 10, via a network access node, such as a Node B (base station), and more specifically an eNB 12.

The network 9 may include a network control element (NCE) 14 that may include the MME/S-GW functionality shown in FIG. 1, and which provides connectivity with a broader network such as a telephone network and/or a data communications network (e.g., the internet).

The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transmitter and receiver 10D for bidirectional wireless communications with the eNB 12 via one or more antennas. The eNB 12 also includes a controller, such as a computer or a data processor (DP) 12A, a computer-readable memory medium embodied as a memory (MEM) 12B that stores a program of computer instructions (PROG) 12C, and a suitable RF transmitter and receiver 12D for communication with the UE 10 via one or more antennas. The eNB 12 is coupled via a data/control path 13 to the NCE 14. The path 13 may be implemented as the S1 interface shown in FIG. 1. The eNB 12 may also be coupled to other eNBs in adjacent cells via representative data/control path 15, which may be implemented as the X2 interface shown in FIG. 1. For completeness, the MME 14 also includes a DP 14A, a MEM 14B storing a PROG 14C, and may include a transmitter and receiver or it may include only a modem for wireline communications over the data/control path 13.

At least one of the PROGs 10C and 12C is assumed to include program instructions that, when executed by the associated DP, enable the device to operate in accordance with the exemplary embodiments of this invention, as will be discussed below in greater detail. That is, the exemplary embodiments of this invention may be implemented at least in part by computer software executable by the DP 10A of the UE 10 and/or by the DP 12A of the eNB 12, or by hardware, or by a combination of software and hardware (and firmware).

For the purposes of describing the exemplary embodiments of this invention the UE 10 may be assumed to also include a cyclic shifter 10E, and the eNB 12 may include a cyclic shifter 12E which removes the cyclic shifts imposed by the UE in its transmitted DFT-S-OFDMA symbols. In accordance with the above embodiments, the cyclic shifter 10E/12E may operate to shift in time or shift frequency bins. The shifters 10E/12E may be implemented in the respective DP 10A/12A such as for the case where the relevant processing is done at baseband, or in the RF front end chip represented as the transmitter and receiver 10D/12D such as for the case where the relevant processing is done at RF, or they may be implemented in some other processor that is slaved to the timing of the DP 10A/12A. Operation of the eNB 12 follows the description above for the UE 10 but in reverse to remove the cyclic shifts from the OFDMA symbols the eNB 12 receives on the PUCCH.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multicore processor architecture, as non-limiting examples.

Based on the foregoing it should be apparent that the exemplary embodiments of this invention provide a method, and an apparatus such as the UE 10 (or one or more components for such a UE) having at least one processor and at least one memory storing a program of computer readable instructions, and a computer program tangibly embodied on a memory. These exemplary embodiments may by example be configured to perform actions such as those detailed at FIG. 6, and as further detailed in the detailed examples above.

Figure 6:
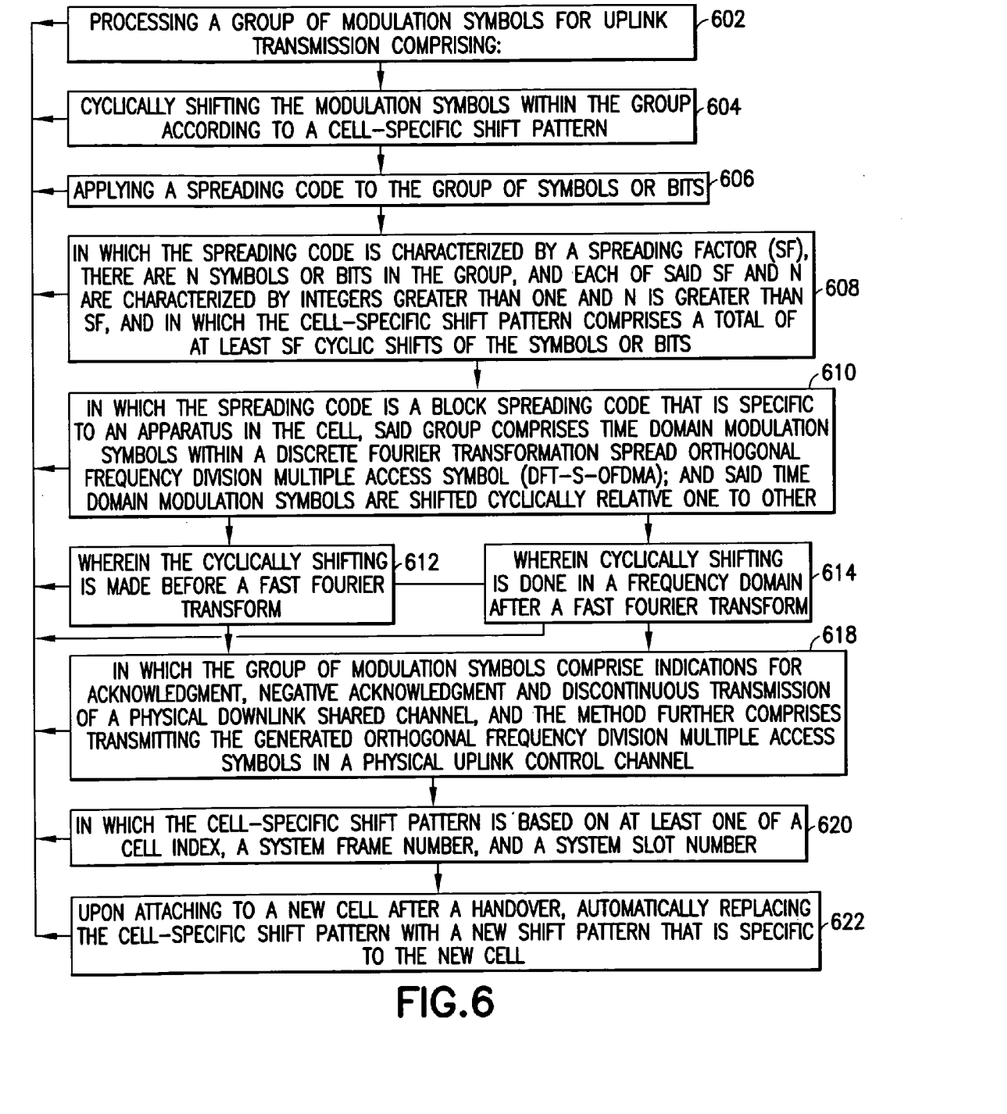
FIG. 6 is a logic flow diagram that illustrates the operation of a method, and a result of execution of computer program instructions embodied on a computer readable memory, in accordance with exemplary embodiments of this invention.

FIG. 6 is a logic flow diagram that illustrates such exemplary actions or method steps. At block 602 there is processing a group of modulation symbols for uplink transmission comprising, At block 604, cyclically shifting the modulation symbols within the group according to a cell-specific shift pattern. The processing at block 606 includes applying a spreading code to the group of symbols or bits. It is noted that the lines between any of the blocks of FIG. 6 show at least that the operations can be performed in view of each other.

The following optional actions or elements may also be performed in conjunction with the broader elements shown explicitly at FIG. 6, either alone or in any various combination:

the spreading code of block 608, the spreading code characterized by a spreading factor (SF), there are N symbols or bits in the group, and each of said SF and N are characterized by integers greater than one and N is greater than SF, and in which the cell-specific shift pattern comprises a total of at least SF cyclic shifts of the symbols or bits.

the spreading code of block 610 in which the spreading code is a block spreading code that is specific to an apparatus in the cell, said group comprises time domain modulation symbols within a discrete Fourier Transformation spread orthogonal frequency division multiple access symbol (DFT-S-OFDMA); and said time domain modulation symbols are shifted cyclically relative one to other.

block 612 where the cyclically shifting is made before a fast Fourier transform.

block 614 where cyclically shifting is done in a frequency domain after a fast Fourier transform.

the modulation symbols of block 618 in which the group of modulation symbols comprise indications for acknowledgement, negative acknowledgement and discontinuous transmission of a physical downlink shared channel, and the method further comprises transmitting the generated orthogonal frequency division multiple access symbols in a physical uplink control channel.

block 620 in which the cell-specific shift pattern is based on at least one of a cell index, a system frame number, and a system slot number.

block 622 where upon attaching to a new cell after a handover, automatically replacing the cell-specific shift pattern with a new shift pattern that is specific to the new cell.

The various blocks shown in FIG. 6, as well as the bullets above expanding on the FIG. 6 blocks may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings, without departing from the broader aspects of these teachings.

While the exemplary embodiments have been described above in the context of the EUTRAN (UTRAN-LTE) system, it should be appreciated that the exemplary embodiments of this invention are not limited for use with only this one particular type of wireless communication system, and that they may be used to advantage in other wireless communication systems such as for example WLAN, UTRAN, GSM and the like.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising, processing, by a user equipment, in parallel a group of N modulated symbols in spreading factor (SF) pathways for uplink transmission, wherein N and SF are integers and SF is equal to a number of elements in a spreading code, comprising:

multiplying, by the user equipment, in parallel each of the N modulated symbols in each of the SF pathways with a unique element of the spreading code and outputting N symbols in each of the SF pathways; and performing, by the user equipment, a cyclic shift to the output N symbols in each of the SF pathways, wherein each SF pathway is using a particular shift from a series of SF cyclic shifts, and wherein the series of cyclic shifts is according to a cell-specific shift pattern.

2. The method according to claim 1, in which said SF and N are characterized by integers greater than one and N is greater than SF;

and in which the cell-specific shift pattern comprises a total of at least the SF cyclic shifts.

3. The method according to claim 1, in which:

the spreading code is a block spreading code that is specific to an apparatus in the cell;

said group of modulated symbols comprises time domain modulated symbols within a discrete Fourier transformation spread orthogonal frequency division multiple access symbol; and said time domain modulated symbols are shifted cyclically relative one to other, wherein the particular shift is based at least on a time domain of the modulated symbols.

4. The method according to claim 3, wherein the cyclically shifting is made before a fast Fourier transform.

5. The method according to claim 3 wherein cyclically shifting is done in a frequency domain after a fast Fourier transform.

6. The method according to claim 1, in which the group of modulated symbols comprise indications for acknowledgement, negative acknowledgement and discontinuous transmission of a physical downlink shared channel;

and the method further comprises transmitting the generated orthogonal frequency division multiple access symbols in a physical uplink control channel.

7. The method according to claim 1, in which the cell-specific shift pattern is based on at least one of a cell index, a system frame number, and a system slot number.

8. The method according to claim 1, the method further comprising:

upon attaching to a new cell after a handover, automatically replacing the cell-specific shift pattern with a new shift pattern that is specific to the new cell.

9. The method according to claim 1 performed by at least one computer program code embodied on at least one memory and executed by at least one processor.

10. An apparatus, comprising:

at least one processor; and at least one memory including computer program code, where the at least one memory and the computer program code are configured, with the at least one processor, to cause the apparatus to at least:

process in parallel a group of N modulated symbols in spreading factor (SF) pathways for uplink transmission, wherein N and SF are integers and SF is equal to a number of elements in a spreading code, comprising:

multiplying in parallel each of the N modulated symbols in each of the SF pathways with a unique element of the spreading code and outputting N symbols in each of the SF pathways; and performing a cyclic shift to the output N symbols in each of the SF pathways, wherein each SF pathway is using a particular shift from a series of SF cyclic shifts, and wherein the series of cyclic shifts is according to a cell specific shift pattern.

11. The apparatus according to claim 10, in which said SF and N are characterized by integers greater than one and N is greater than SF;

and in which the cell-specific shift pattern comprises a total amount of at least SF cyclic shifts.

12. The apparatus according to claim 10, in which:

the spreading code is a block spreading code that is specific to the apparatus in the cell;

said group of modulated symbols comprises time domain modulated symbols within a discrete Fourier transformation spread orthogonal frequency division multiple access symbol; and in which the at least one memory including the computer program code is configured, with the at least one processor to cause the apparatus to cyclically shift said time domain modulated symbols relative one to other, wherein the particular shift is based at least on a time domain of the modulated symbols.

13. The apparatus according to claim 12, wherein the cyclically shifting is made before a fast Fourier transform.

14. The apparatus according to claim 12, wherein cyclically shifting is done in a frequency domain after a fast Fourier transform.

15. The apparatus according to claim 10, in which the group of modulated symbols comprise indications for acknowledgement, negative acknowledgement and discontinuous transmission of a physical downlink shared channel;

and in which the at least one memory including the computer program code is configured, with the at least one processor to cause the apparatus to transmit the generated orthogonal frequency division multiple access symbols in a physical uplink control channel.

16. The apparatus according to claim 10, in which the cell-specific shift pattern is based on at least one of a cell index, a system frame number, and a system slot number.

17. The apparatus according to claim 10, wherein the at least one memory including the computer program code is configured, with the at least one processor to cause the apparatus, upon attaching to a new cell after a handover, to automatically replace the cell-specific shift pattern with a new shift pattern that is specific to the new cell.

18. The apparatus according to claim 17, in which cyclically shifting the frequency response is before applying the spreading code and is done via a Fourier transform.

19. An apparatus comprising:

means for processing in parallel a group of N modulation symbols in spreading factor (SF) pathways for uplink transmission, wherein N and SF are integers and SF is equal to a number of elements in a spreading code, comprising:

means for multiplying in parallel each of the N modulated symbols in each of the SF pathways with a unique element of the spreading code and outputting N symbols in each of the SF pathways; and means for performing a cyclic shift to the output N symbols in each of the SF pathways, wherein each SF pathway is using a particular shift from a series of SF cyclic shifts, and wherein the series of cyclic shifts is according to a cell-specific shift pattern.

20. The apparatus according to claim 19, wherein the means for processing, means for multiplying, and the means for cyclically shifting comprise at least one computer program code embodied on at least one memory and executed by at least one processor.

\* \* \* \* \*